(12) United States Patent
Masuda et al.

(10) Patent No.: US 8,184,103 B2
(45) Date of Patent: May 22, 2012

(54) MOBILE TERMINAL HAVING MOVING KEYPAD

(75) Inventors: Yusuru Masuda, Tokyo (JP); Jong Seong Lee, Tokyo (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 12/397,919

(22) Filed: Mar. 4, 2009

(65) Prior Publication Data

US 2009/0244022 A1    Oct. 1, 2009

(30) Foreign Application Priority Data

Mar. 27, 2008  (KR) .................. 10-2008-0028610

(51) Int. Cl.
*G06F 3/041* (2006.01)
(52) U.S. Cl. ...................................... 345/173
(58) Field of Classification Search .............. 345/173
See application file for complete search history.

(56) References Cited

U.S. PATENT DOCUMENTS

| | | | |
|---|---|---|---|
| 7,331,516 B2 * | 2/2008 | Hwang et al. ............. | 235/380 |
| 2003/0112225 A1 * | 6/2003 | Granberg ................. | 345/173 |
| 2006/0005131 A1 * | 1/2006 | Tao ........................ | 715/702 |
| 2006/0111161 A1 * | 5/2006 | Cha et al. ............... | 455/575.4 |
| 2009/0009480 A1 * | 1/2009 | Heringslack ............. | 345/173 |

FOREIGN PATENT DOCUMENTS

| | | | |
|---|---|---|---|
| EP | 1713236 A1 | * | 10/2006 |
| GB | 2362944 | | 12/2001 |
| WO | 03/021922 | | 3/2003 |
| WO | 2006/005993 A2 | | 1/2006 |
| WO | 2007/005506 | | 1/2007 |

OTHER PUBLICATIONS

European Office Action dated Dec. 15, 2010 for European patent application EP 09 155 450.1, which corresponds to U.S. Appl. No. 12/397,919.
European Search Report dated Jul. 14, 2009.

* cited by examiner

*Primary Examiner* — Joseph Haley
*Assistant Examiner* — Nicholas Lee
(74) *Attorney, Agent, or Firm* — H.C. Park & Associates, PLC

(57) ABSTRACT

The present invention provides a mobile terminal including a moving keypad. The mobile terminal includes: a main body; a touch screen disposed at a surface of the main body; a fixed keypad disposed adjacent to the touch screen at the surface of the main body; and a moving keypad to move on the fixed keypad and the touch screen.

13 Claims, 5 Drawing Sheets

(a)

(b)

(a)

(b)

MOBILE TERMINAL HAVING MOVING KEYPAD

CROSS REFERENCE TO RELATED APPLICATION

This application claims priority from and the benefit of Korean Patent Application No. 10-2008-0028610, filed on Mar. 27, 2008, which is hereby incorporated by reference for all purposes as if fully set forth herein.

BACKGROUND OF THE INVENTION

1. Field of the Invention

The present invention relates to a mobile terminal, and more particularly, to a mobile terminal having a moving keypad that moves on a touch screen and a fixed keypad.

2. Discussion of the Background

A mobile terminal is an electronic device that enables a user to freely communicate almost regardless of time and location. In addition to a simple communication function, a mobile terminal may allow a user to perform several functions, such as connect to the Internet, receive digital broadcasting, write messages, and play games. In order to allow the user to perform these various functions, the mobile terminal may require various keys. However, because the mobile terminal has a limited size in order to improve the user's carrying convenience, it may be difficult to mount many keys on the mobile terminal. In order to solve this problem, a touch screen may be included in the mobile terminal.

When a user's hand or a touching means touches a specific position of the touch screen, the touch screen recognizes a touch position and performs an input and output function, so as to perform a specific processing operation with stored software. The touch screen may have a configuration in which a touch panel is attached to a general screen. Infrared rays may be emitted between right and left sides and between upper and lower sides of the touch screen, thereby forming a quadrangular lattice pattern thereon. Therefore, when a fingertip or a touching means touches the touch screen within the lattice pattern, the touch screen recognizes a touch position.

Because the touch screen may display virtual keys thereon and change the keys according to a functional situation, the touch screen may allow a user to manipulate the mobile terminal in a variety of functional situations without increasing the quantity of keys. However, because a user may not receive a good physical impression of which virtual keys are manipulated through the touch screen, compared with the physical impression received when using a physical keypad, it may be difficult for the user to effectively manipulate the touch screen.

SUMMARY OF THE INVENTION

The present invention provides a mobile terminal including a moving keypad in which a user may receive an improved physical impression when inputting a key and may effectively manipulate a touch screen using the moving keypad.

The present invention further provides a mobile terminal having a moving keypad that creates a space for mounting a touch screen within the mobile terminal.

Additional features of the invention will be set forth in the description which follows, and in part will be apparent from the description, or may be learned by practice of the invention.

The present invention discloses a mobile terminal including: a main body; a touch screen disposed at a surface of the main body; a fixed keypad disposed adjacent to the touch screen at the surface of the main body; and a moving keypad to move on the fixed keypad and the touch screen.

The present invention also discloses a mobile terminal including: a main body comprising a first input unit and a touch screen disposed adjacent to the first input unit, the first input unit and the touch screen being fixed in position relative to each other; and a second input unit movably coupled with the main body, the second input unit being moveable to a first position where it completely covers the first input unit and to a second position where it completely exposes the first input unit and partially covers the touch screen.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
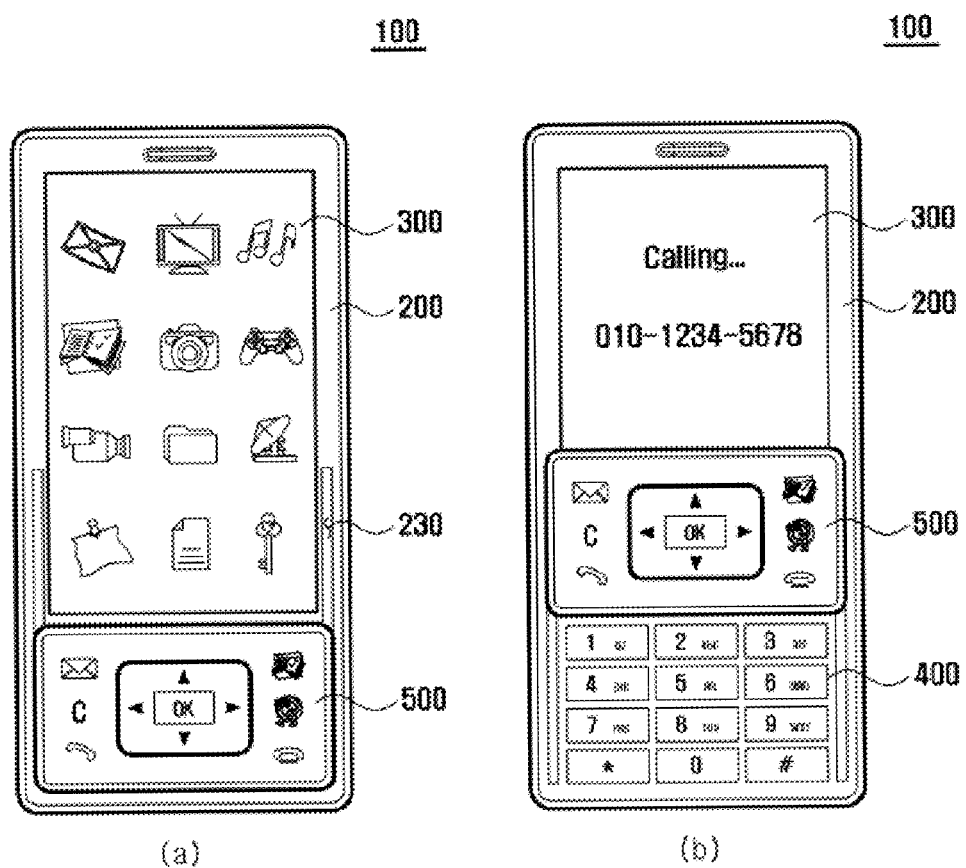
FIG. 1 is a diagram showing a moving state of a moving keypad in a mobile terminal including the moving keypad, according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

FIG. 1 is a diagram showing a moving state of a moving keypad in a mobile terminal having the moving keypad, according to an exemplary embodiment of the present invention.

Referring to FIG. 1(a) and FIG. 1(b), a mobile terminal 100 includes a main body 200, a touch screen 300, a fixed keypad 400, and a moving keypad 500. The main body 200 has a bar shape. The touch screen 300 is positioned at one surface of the main body 200. The fixed keypad 400 is positioned at the surface of the main body 200 at which the touch screen 300 is provided. The fixed keypad 400 is positioned adjacent to the touch screen 300. The main body 200 has a sliding groove 230 formed along a side of the touch screen 300 and the fixed keypad 400. The moving keypad 500 moves on the fixed keypad 400 and the touch screen 300 along the sliding groove 230. In the present exemplary embodiment, the fixed keypad 400 has keys for inputting numerals and characters, and the moving keypad 500 has function keys, such as a navigation key, communication, and character message function keys, and an Internet connection key. Keys provided in the fixed keypad 400 and the moving keypad 500 may be changed according to a design or intended use of the mobile terminal 100.

To use the full area of the touch screen 300 of the mobile terminal 100, the moving keypad 500 is positioned at a first position, as shown in FIG. 1(a). The first position is a position at which the moving keypad 500 covers the entire fixed keypad 400, and thereby the fixed keypad 400 is not exposed to the outside. By touching icons displayed on the touch screen 300 of the mobile terminal 100 with a hand or a touching means (such as a pen), a user may manipulate the mobile terminal 100.

When the user intends to input character or numeral keys using the fixed keypad 400, the user can position the moving keypad 500 at a second position by sliding the moving keypad 500 along the sliding groove 230, as shown in FIG. 1(b). The second position is a position at which the moving keypad 500 partially covers the touch screen 300, and thereby the fixed keypad 400 is completely exposed to the outside. Because the fixed keypad 400 is exposed to the outside, the user may manipulate the mobile terminal 100 using the fixed keypad 400. When manipulating the mobile terminal 100 using the fixed keypad 400, the user may effectively manipulate the mobile terminal 100.

Figure 2:
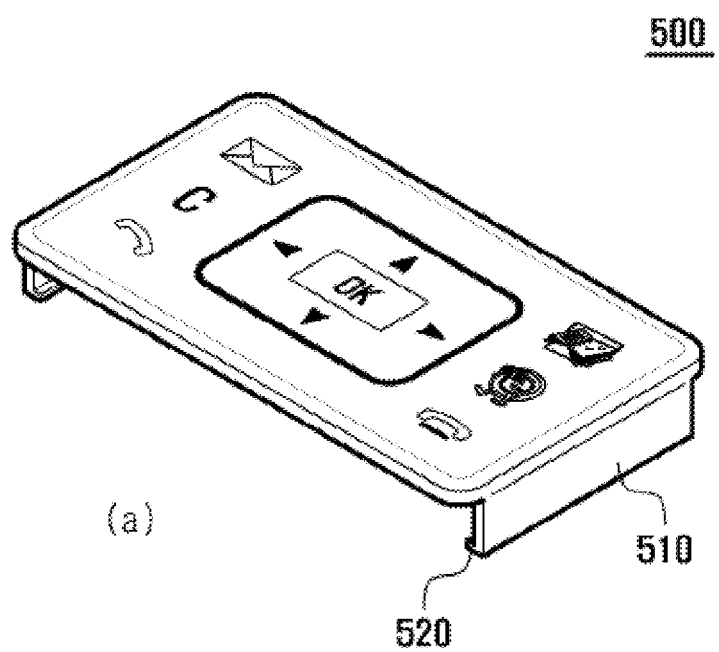
FIG. 2 is a perspective view showing the moving keypad of the mobile terminal of FIG. 1.
Figure 2:
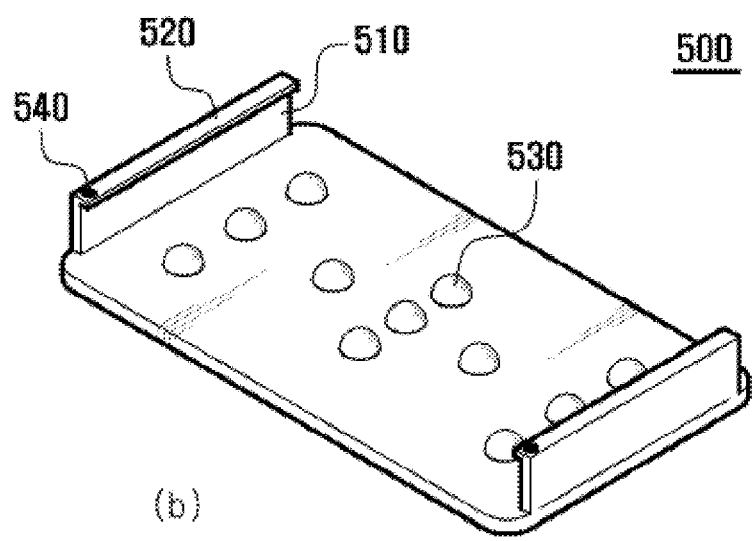

FIG. 2 is a perspective view showing the moving keypad 500 of the mobile terminal 100 of FIG. 1.

Referring to FIG. 2(a), the moving keypad 500 has a navigation key and at least one function key at a surface exposed to the outside. The moving keypad 500 has a rib 510 formed perpendicular to the moving keypad 500 at a side surface thereof. In the present exemplary embodiment, the rib 510 is formed at both side surfaces of the moving keypad 500. However in another exemplary embodiment, the rib 510 may be formed at only one side surface of the moving keypad 500. The rib 510 moves along the sliding groove 230 formed in the main body 200. The rib 510 has a retention portion 520 formed at an edge thereof, and the retention portion 520 is parallel to the inner surface of the moving keypad 500 and faces inwards towards the main body 200. The retention portion 520 may be formed perpendicular to the side surface of the rib 510. When the moving keypad 500 moves along the sliding groove 230, the retention portion 520 prevents the moving keypad 500 from separating from the main body 200.

Referring to FIG. 2(b), the moving keypad 500 has protrusions 530 at a surface opposite to the surface exposed to the outside. The protrusions 530 are formed at positions corresponding to the keys provided in the moving keypad 500. If the user presses a key of the moving keypad 500, the protrusion corresponding to the pressed key 530 presses the touch screen 300 or the fixed keypad 400, according to the present position of the moving keypad 500, whereby a signal is transferred to a circuit of the mobile terminal 100.

A rib magnet 540 is positioned at the rib 510 of the moving keypad 500. In the present exemplary embodiment, the rib magnet 540 is positioned at the retention portion 520 of the rib 510. However a position of the rib magnet 540 is not limited thereto.

Figure 3:
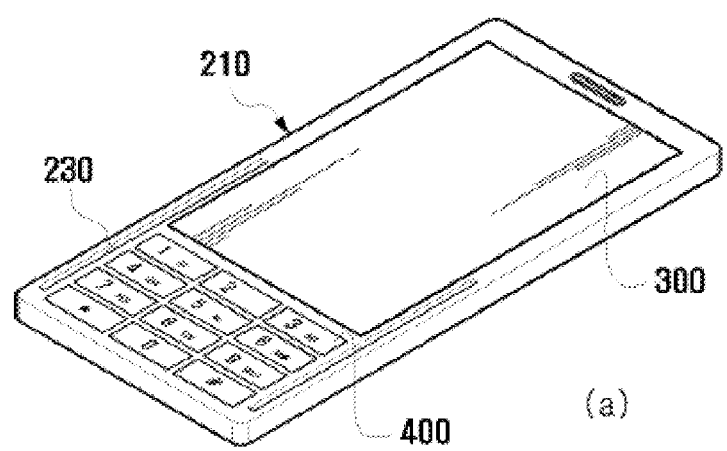
FIG. 3 is a perspective view showing an upper case and a lower case of a main body of the mobile terminal of FIG. 1.
Figure 3:
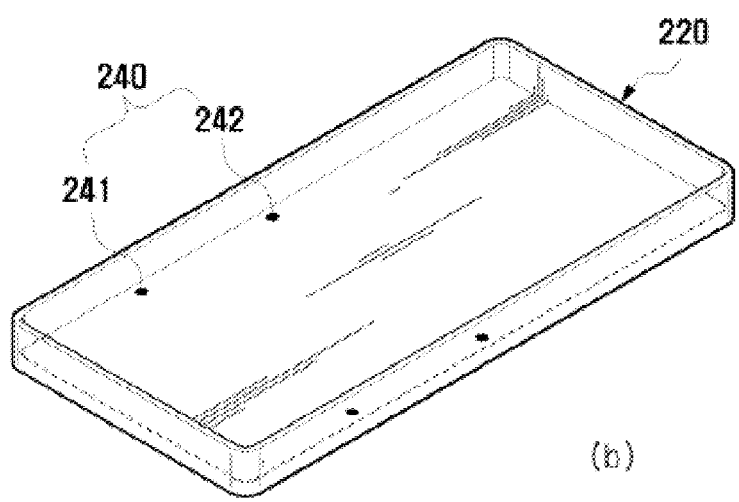

FIG. 3 is a perspective view showing an upper case and a lower case of the main body 200 of the mobile terminal 100 of FIG. 1.

Referring to FIG. 3, the main body 200 of the mobile terminal 100 of the present exemplary embodiment includes an upper case 210 and a lower case 220. In another exemplary embodiment, the main body 200 may be formed as a single case. The touch screen 300 and the fixed keypad 400 are positioned at the upper case 210. The sliding groove 230 is formed parallel to one side of the upper case 210, along the side of the touch screen 300 and the fixed keypad 400. In the present exemplary embodiment, the touch screen 300 and the fixed keypad 400 may be formed in a single touch panel.

A circuit of the mobile terminal 100, such as a printed circuit board (PCB), may be mounted within the lower case 220. Further, a fixing magnet 240 is positioned within the lower case 220 at an inner surface thereof. The fixing magnet 240 contacts the rib 510 of the moving keypad 500. The fixing magnet 240 includes a first fixing magnet 241 that contacts the rib magnet 540 of the moving keypad 500 when the moving keypad 500 is positioned at the first position, and a second fixing magnet 242 that contacts the rib magnet 540 of the moving keypad 500 when the moving keypad 500 is positioned at the second position. The fixing magnet 240 is mounted so that the surface thereof that contacts the rib magnet 540 has a magnetic pole opposite to that of the corresponding contacting surface of the rib magnet 540. In the present exemplary embodiment, the fixing magnet 240 is positioned within the lower case 220. However, in another exemplary embodiment, the position of the fixing magnet 240 may be changed according to the position of the rib magnet 540 of the moving keypad 500.

Figure 4:
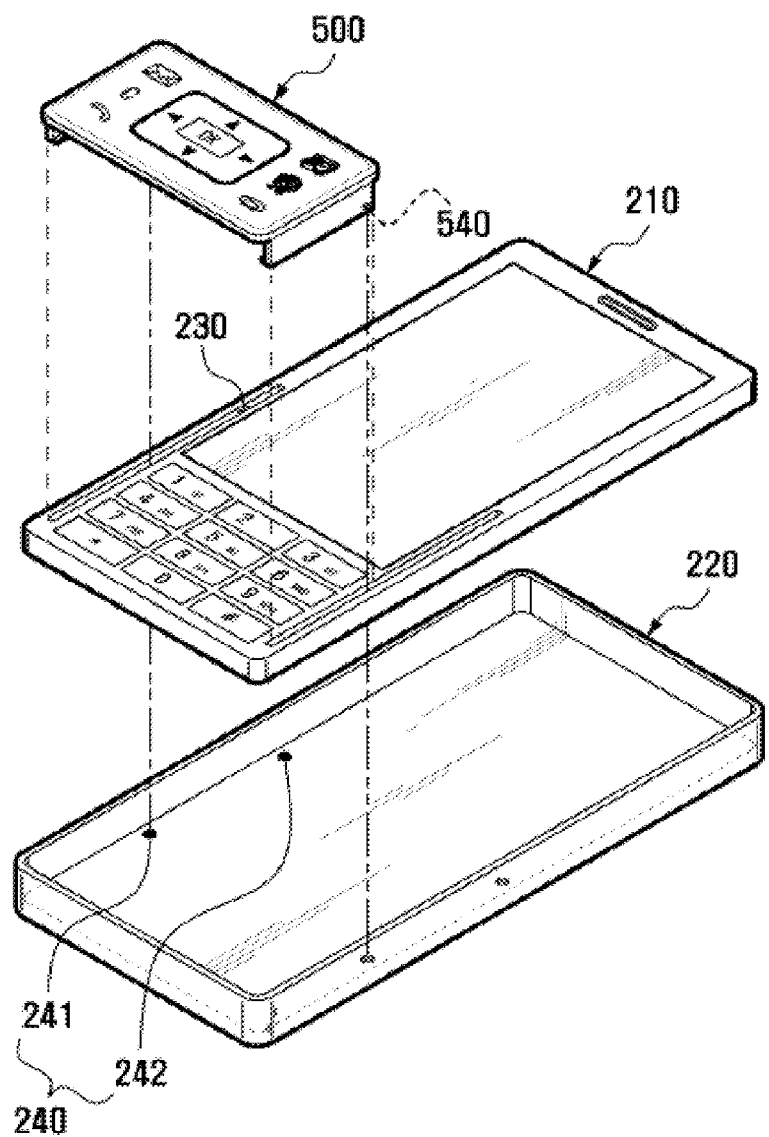
FIG. 4 is an exploded perspective view of the mobile terminal of FIG. 1.

FIG. 4 is an exploded perspective view of the mobile terminal 100 of FIG. 1.

Referring to FIG. 4, the moving keypad 500 moves along the sliding groove 230. The rib magnet 540 of the moving keypad 500 contacts the first fixing magnet 241 at the first position. When the moving keypad 500 is moved to the second position, the rib magnet 540 contacts the second fixing magnet 242. Because the contacting surfaces of the rib magnet 540 and the fixing magnet 240 have opposite magnetic poles, magnetic attraction operates between the rib magnet 540 and the fixing magnet 240. Therefore, the moving keypad 500 can be securely fixed at either the first position or the second position without a variable positioning and without undesirable freedom of movement of the positioned moving keypad 500.

Figure 5:
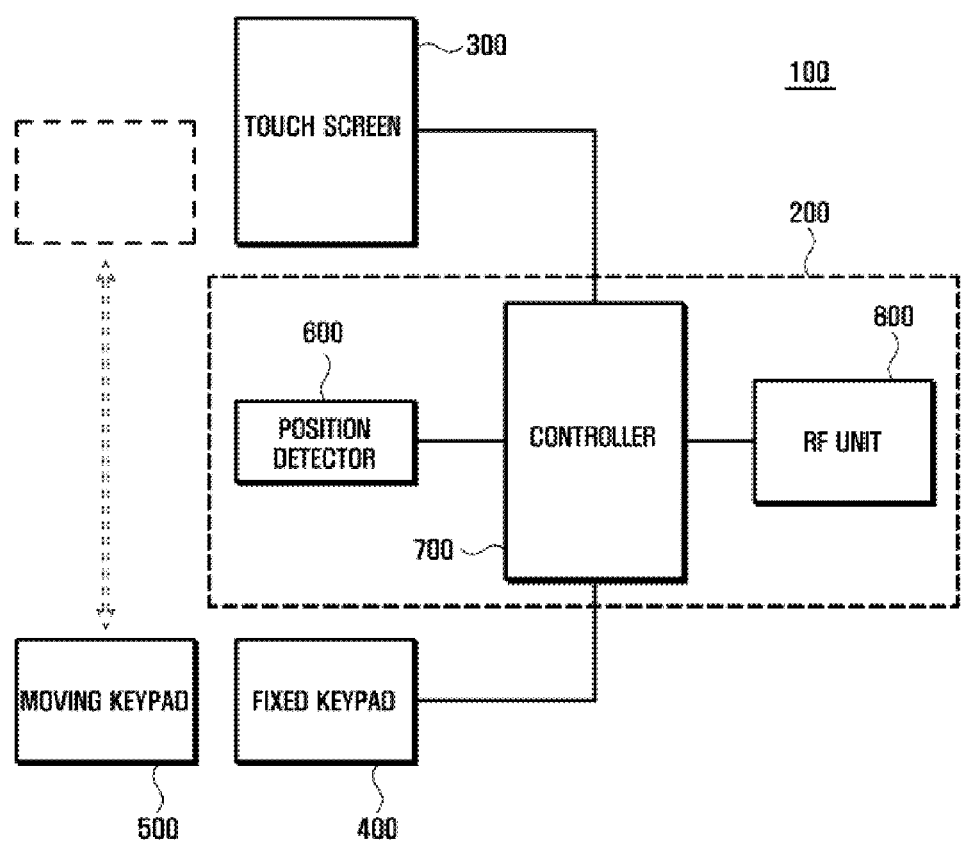
FIG. 5 is a block diagram showing a configuration of the mobile terminal of FIG. 1.

FIG. 5 is a block diagram showing a configuration of the mobile terminal 100 of FIG. 1.

Referring to FIG. 5, the mobile terminal 100 includes the main body 200, touch screen 300, fixed keypad 400, and moving keypad 500. The main body 200 includes a position detector 600, controller 700, and radio frequency (RF) unit 800. The position detector 600 detects a position of the moving keypad 500. The position detector 600 may be a position detection sensor or a fixing magnet provided in the main body 200. When a fixing magnet is used as the position detector 600, a position of the moving keypad 500 can be determined by detecting that a rib magnet of the moving keypad 500 contacts with the fixing magnet.

The controller 700 receives the detected position of the moving keypad 500 from the position detector 600. The controller 700 recognizes a signal input to the touch screen 300 and the fixed keypad 400 according to a position of the moving keypad 500. When the moving keypad 500 is positioned at the first position, the controller 700 recognizes a signal input to the entire touch screen 300 as a signal of the touch screen 300, and recognizes a signal input to the fixed keypad 400 covered by the moving keypad 500 as a signal of the moving keypad 500. When the moving keypad 500 is positioned at the second position, the controller 700 recognizes a signal input to a portion of the touch screen 300 covered by the moving keypad 500 as a signal of the moving keypad 500, and recognizes a signal input to the fixed keypad 400 as a signal of the fixed keypad 400. Further, the controller 700 controls the mobile terminal 100 so only an exposed portion of the touch screen 300 is used as a display unit of the mobile terminal 100.

The RF unit 800 performs wireless communication of the mobile terminal 100. The RF unit 800 transmits and receives a wireless signal through a communication network. The mobile terminal 100 can perform voice communication, transmission and reception of a character message, and data communication through the RF unit 800.

The mobile terminal according to an exemplary embodiment of the present invention may be a portable electronic device, such as a mobile phone, personal digital assistant (PDA), navigation device, digital broadcasting receiver, and portable multimedia player (PMP).

As described above, according to the present invention, as a user manipulates a mobile terminal using a moving keypad, when inputting a key, the user may receive an improved physical impression and may effectively manipulate a touch screen using the moving keypad.

Further, because the moving keypad may move between the touch screen and a fixed keypad, a space for mounting the touch screen within the mobile terminal is made available.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
a main body;
a touch screen disposed at a surface of the main body;
a fixed keypad disposed adjacent to the touch screen at the surface of the main body; and
a moving keypad to move between a first position at which the touch screen is completely exposed to the outside and a second position at which the fixed keypad is completely exposed to the outside,
wherein the moving keypad comprises at least one key disposed at a surface thereof and exposed to the outside, and at least one protrusion disposed at a surface opposite to the surface at which the at least one key is disposed,
wherein each protrusion corresponds to each key comprising the moving keypad,
wherein the moving keypad transmits signals to a circuit of the mobile terminal through the protrusion, and
wherein the main body further comprises a position detector to detect a position of the moving keypad and a controller to recognize a signal of the fixed keypad generated by pressing a key of the moving keypad as a signal of the moving keypad when the moving keypad is positioned at the first position and a signal of the touch screen generated by pressing the key of the moving keypad as a signal of the moving keypad when the moving keypad is positioned at the second position.

2. The mobile terminal of claim 1, wherein the main body comprises a sliding groove formed along a side of the touch screen and the fixed keypad, and
the moving keypad comprises a rib formed at a side surface thereof, the rib to move along the sliding groove.

3. The mobile terminal of claim 2, wherein the fixed keypad comprises at least one numeral key, and
the moving keypad comprises a navigation key and at least one function key.

4. The mobile terminal of claim 2, wherein the rib comprises a retention portion formed at an edge thereof, the retention portion facing inwards towards the main body.

5. The mobile terminal of claim 1, wherein the moving keypad moves between a first position at which the fixed keypad is not exposed to the outside and a second position at which the fixed keypad is completely exposed to the outside,
the rib of the moving keypad comprises a rib magnet arranged at a surface that contacts the main body, and
the main body comprises a first fixing magnet that contacts the rib magnet when the moving keypad is positioned at the first position and a second fixing magnet that contacts the rib magnet when the moving keypad is positioned at the second position.

6. The mobile terminal of claim 1, wherein the main body comprises a bar shape.

7. A mobile terminal, comprising:
a main body comprising a first input unit and a touch screen disposed adjacent to the first input unit, the first input unit and the touch screen being fixed in position relative to each other; and
a second input unit movably coupled with the main body, the second input unit being moveable to a first position where it completely covers the first input unit and to a second position where it completely exposes the first input unit and partially covers the touch screen,
wherein the second input unit comprises at least one key disposed at a surface thereof and exposed to the outside, and at least one protrusion disposed at a surface opposite to the surface at which the at least one key is disposed,
wherein each protrusion corresponds to each key comprising the second input unit,
wherein the second input unit transmits signals to a circuit of the mobile terminal through the protrusion, and
wherein the main body further comprises a position detector to detect a position of the second input unit and a controller to recognize a signal of the first input unit generated by pressing a key of the second input unit as a signal of the second input unit when the second input unit is positioned at the first position and a signal of the touch screen generated by pressing the key of the second input unit as a signal of the second input unit when the second input unit is positioned at the second position.

8. The mobile terminal of claim 7 wherein the second input unit is slidably coupled with the main body.

9. The mobile terminal of claim 8, wherein the main body comprises a sliding groove formed along a side of the touch screen and the first input unit, and
the second input unit comprises a rib formed at a side surface thereof, the rib to move along the sliding groove.

10. The mobile terminal of claim 9, wherein the rib comprises a retention portion formed at an edge thereof, the retention portion facing inwards towards the main body.

11. The mobile terminal of claim 7, wherein the first input unit and the second input unit each comprises a keypad.

12. The mobile terminal of claim 7, wherein the second input unit moves between a first position at which the first input unit is not exposed to the outside and a second position at which the first input unit is completely exposed to the outside, the rib of the moving keypad comprises a rib magnet arranged at a surface that contacts the main body, and
the main body comprises a first fixing magnet that contacts the rib magnet when the second input unit is positioned at the first position and a second fixing magnet that contacts the rib magnet when the second input unit is positioned at the second position.

13. The mobile terminal of claim 7, wherein the main body comprises a bar shape.

* * * * *